April 28, 1970 A. BOTTANI 3,508,816

PROJECTION APPARATUS HAVING MULTIPLE SOUND UNIT

Filed May 26, 1967 3 Sheets-Sheet 1

INVENTOR
ANGELO BOTTANI
BY

ATTORNEYS.

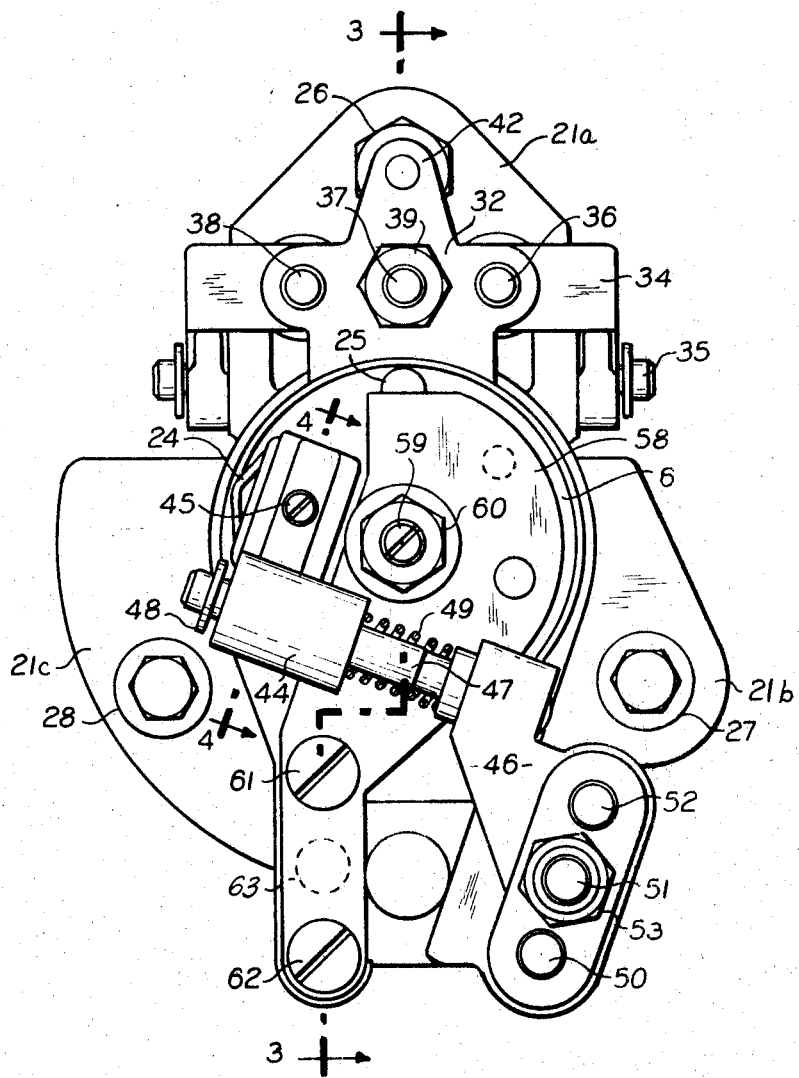

INVENTOR
ANGELO BOTTANI
BY
ATTORNEYS.

United States Patent Office 3,508,816
Patented Apr. 28, 1970

3,508,816
PROJECTION APPARATUS HAVING MULTIPLE SOUND UNIT
Angelo Bottani, Corso Matteotti 10, Milan, Italy
Filed May 26, 1967, Ser. No. 641,571
Claims priority, application Italy, June 3, 1966, 18,623/66
Int. Cl. G03b 31/02
U.S. Cl. 352—6
10 Claims

ABSTRACT OF THE DISCLOSURE

A multiple sound unit for coin actuated audio-visual projectors. At least three sound pickups are disposed about a rotatable sound drum, two of the pickups being in the same radial plane and one being in a different radial plane. The pickups are relatively adjustably positionable with respect to one another.

---

Figure 1:
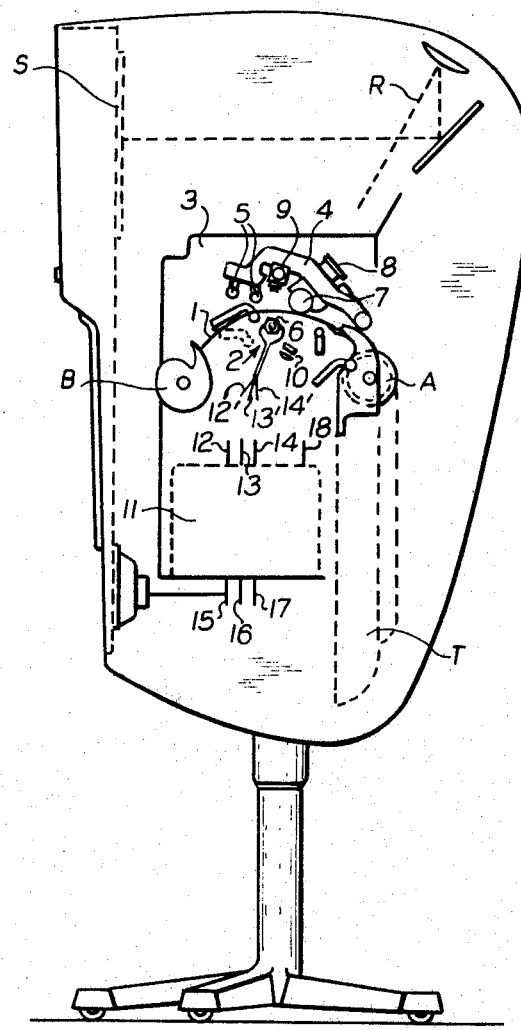

This invention relates to a projection apparatus comprising at least one movable pressure member such as a pressure plate which during projection bears against and holds a selected film in the correct position of projection. The invention is particularly applicable to automatic audio-visual projection apparatus provided with a movable pressure member, which apparatus is controlled by coil, token or pushbutton.

One object of the present invention is to provide a motion picture projection apparatus which makes it possible to increase the number of sound and/or spoken-work programs available to the users, for a given number of films stored therein.

Another object is to obtain an apparatus which makes possible, in addition to the reproduction of sound, the recording of sound, either without or simultaneously with a visual projection.

Another purpose is to obtain, either simultaneously or not, in combination with the recording and reproduction of sound (including the spoken word) and the visual projection, the recording and/or reproduction of control signals for the actuating of additional apparatus associated with the projector.

Another object is to obtain an apparatus which, in addition to being suitable for amusement and purposes of recreation, is particularly useful for educational, advertising and commercial purposes.

The above and other objects are obtained by providing projection apparatus adapted to project at least one film having a plurality of sound tracks, said projection apparatus including a sound group comprising a drum and a plurality of devices for the recording and/or playback of sound and control signals, said devices being disposed about the drum in such manner that each device is adapted to cooperate with a sound track of the multiple sound track film upon actuation of the projection apparatus. Actuation may be effected by any external means, including pushbutton and coinbox, which results in a movable pressure member bringing and holding the film against the surface of the sound drum. Preferably, the sound drum and the sound devices are carried on a single group support, which support is in turn attached to the base of the projection apparatus.

The sound devices may be of any type for instance magnetic or optical.

Each magnetic sound device comprises a conventional type of head which in addition to the playback and recording of sound, may also be used for the recording and/or playback of information or control signals. Each optical sound device comprises a photosensitive element and an associated source of light which are brought close together only during the projection. During the playback, the various sound devices are connected through the amplifier or amplifiers of the apparatus to the loudspeakers and/or ear sets and additional apparatus associated with the projector. When recording, the sound devices are connected, again through amplification apparatus, to microphones or other signal sources.

The support of each device is connected to the group support by a movable mechanical connection which makes it possible to bring the sound device into the proper position with respect to the corresponding sound track.

The above and other objects, characteristics and features of the present invention will be more fully understood from the following description taken in connection with the accompanying illustrative drawings which, solely by way of example, show an automatic audio-visual projection apparatus comprising a sound group provided with three sound devices, two being magnetic and one optical, in combination with 16 mm. films having three sound tracks, two being magnetic and one optical, stored in the apparatus.

Figure 4:
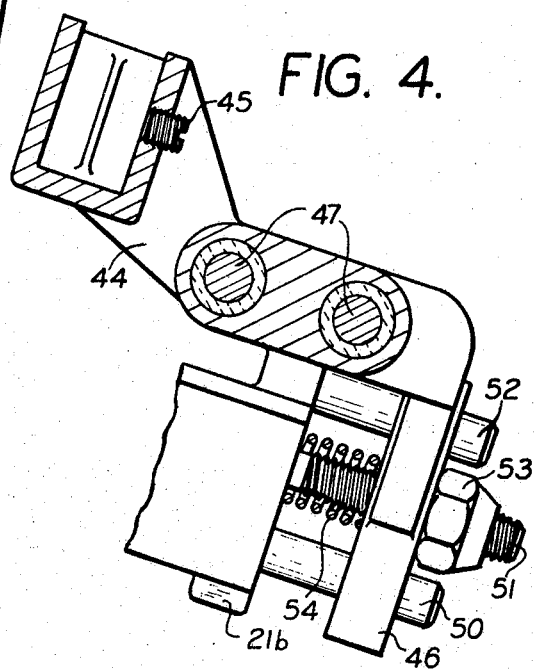
Figure 5:
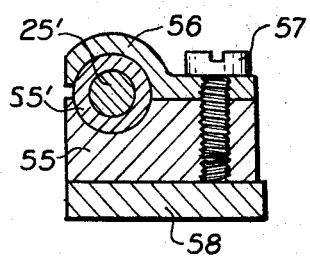
Figure 3:
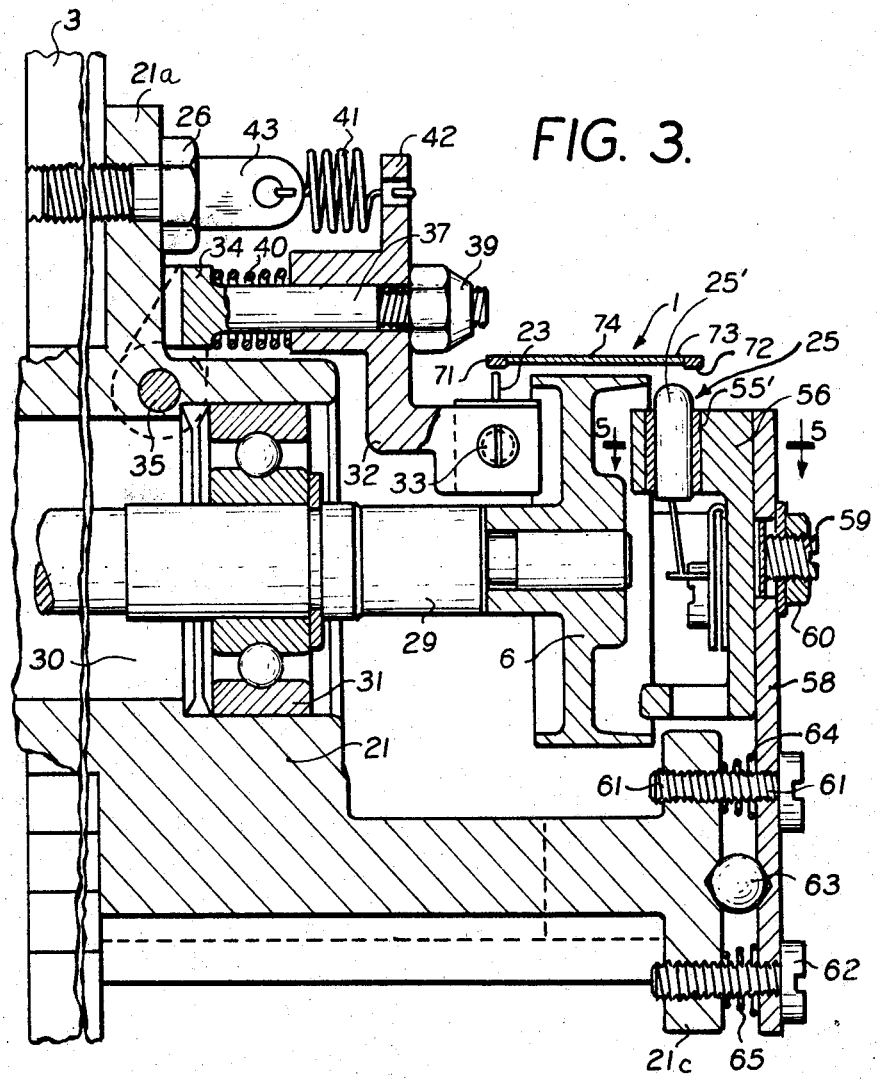
Figure 6:
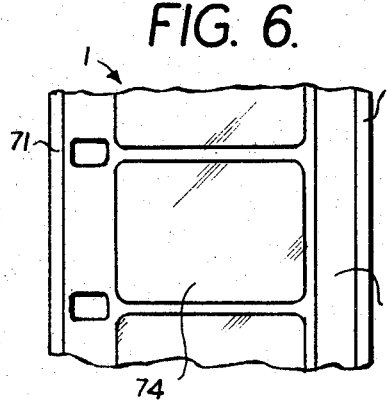
Figure 7:
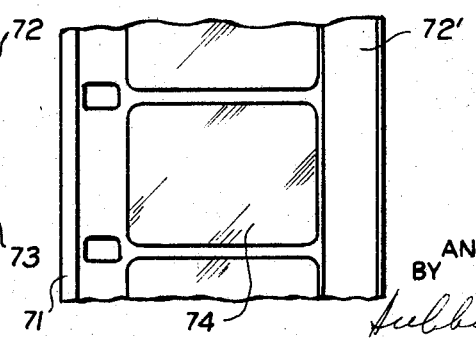

In the drawings:
FIG. 1 is a schematic side sectional view of an automatic projection apparatus embodying the present invention;
FIG. 2 is an enlarged side elevational view of the sound group including the drum and associated sound devices of the apparatus of FIG. 1;
FIG. 3 is a sectional view taken along the line 3—3 of FIG. 2;
FIG. 4 is a sectional view taken along the line 4—4 of FIG. 2;
FIG. 5 is a sectional view taken along the line 5—5 of FIG. 3;
FIG. 6 is a plan view of the 16 mm. film used in the apparatus of FIGS. 1–5 and provided with two magnetic sound tracks and one optical sound track; and
FIG. 7 is a plan view of a modified form of the 16 mm. film shown in FIG. 6.

Referring now to the drawings in detail, the projection apparatus embodying the present invention is shown in FIG. 1, with a 16 mm. film 1 having a multiplicity of sound tracks thereon arranged within a multiple sound recording and reproducing group 2 mounted on a frame 3 of the apparatus. A movable pressure member comprising an oscillating arm 4 is mounted on frame 3 for biasing the film 1 against a sound drum 6 of sound group 2 as described in greater detail hereinafter. This arm is shown in the retracted or raised position in which it does not engage the film, but during the projection it assumes a lowered operating position in which, by means of its own guide rollers 5 and other cooperating rollers (not shown) mounted on the frame 3, it holds the film pressed against the sound drum 6 of the sound device 2.

While the arm 4 is shown in FIG. 1 as being disposed above the film 1 with the sound group 2 disposed below the film, it is obvious that the position of these two members can be reversed if desired.

Solely by way of example, the apparatus shown is of the type comprising a rotating magazine T bearing feed reels A connected in turn to a single takeup spool B. Such an apparatus is described and illustrated in U.S. Patent No. 3,081,668. It is obvious, however, that the invention is applicable to any type of projection apparatus including apparatus having two magazines rotating together around a horizontal or vertical shaft, one bearing the feed spools and the other the takeup spools. An apparatus of this type with horizontal axis is illustrated in U.S. Patent No. 3,041,926. The invention is also applicable to apparatus in which the film or films have several lengths or sections of film each corresponding to one program (for instance, song), the desired section being selected by unwinding the film from the feed spool.

In the case of an apparatus provided with two magazines forming a bell, it is also obvious that the arm 4 may be inside or outside the bell and this correspondingly may be true of the associated sound group 2.

The arm 4 has mounted thereon a prism 7, and an associated objective lens 8 and lamp 9 which cooperate with the optical sound device of the group 2 for the reproduction of the optical sound track of the film when said arm 4 is in the operating or projecting position.

The lamp 9 obviously can be mounted on the frame 3 of the apparatus in which case the multiple-sound group 2 will be mounted on the oscillating arm 4. The arm 4 can be replaced by any other pressure member which is movable, for instance a plate which is displaceable parallel to itself. The pressure member can also consist of two members which move towards and away from each other with any desired type of movement. In particular, the two members may be two plates, bearing the various devices of the apparatus, which are movable parallel to each other and in opposite directions. In the case of machines in which the film magazine is formed by a number of movable film or tape cartridges which are selectively interchangeable, each of these cartridges carrying a film or a tape, which unwinds and winds on the same reel or onto two different reels contained in said cartridge, the pressure member may consist of the cartridge itself, whatever its movement may be, to carry the film in the proper position for its sound reproduction and recording. Referring to the embodiments shown, the prism 7, the objective lens 8 and a projection lamp 10 mounted on the frame 3 constitute the optical means for the visual projection of the film onto a viewing screen S. During projection, these members are aligned along the optical axis R.

Associated with sound group 2 is amplification apparatus 11 which includes one or more amplifiers (not shown) adapted to be connected at connections 12, 13 and 14 to connections 12', 13' and 14' respectively of the three sound devices and, at connections 15, 16 and 17 to the loudspeaker and/or the headphones and additional apparatus to be controlled.

A connection from the amplifiers to the microphones for the recording of the sound or for commentary upon the projection of the film is provided at 18. The same connection 18 or another connection serves to effect the connection with the source (not shown) which supplies the information or control signals to be recorded.

Referring to FIGS. 2 and 3, the sound group 2, shown on a larger scale, comprises a support 21, hereinafter referred to as the group support and, mounted on said support, the sound drum 6, two magnetic devices 23 and 24 and an optical device 25. The group support 21 has three flanges 21a, 21b, 21c, which serve to connect support 21 to the frame 3 of the projection apparatus by means of bolts 26, 27, 28. In FIG. 3 there is also shown the film 1 in the non-projecting position, that is, separated from the drum 6. The drum 6 is mounted on a rotation shaft 29 which shaft 29 projects through an opening 30 of the group support 21 and is mounted by a pair of bearings only one of which, designated 31, is shown in the drawing. The rotation of drum 6 is effected by the film 1 when the latter is biased against the drum 6 and is being projected. On the rotation shaft 29 there is also mounted, on the side opposite the drum 6, a suitable flywheel, not shown in the drawing.

The first magnetic sound device 23 is mounted on a support 32 by means of a screw 33 which screw also serves to hold device 23 in the proper position with respect to the film. This device 23 is of a known type and consists essentially of a magnetic head which is connected via one of the connections (12, 13, 14) of the amplifier apparatus 11 to the sound reproduction apparatus and/or to the supplementary apparatus by means of connections (15, 16, 17) of amplifier 11. If the device is also to be used for the recording of sound or control signals on a magnetic track, the head will be of the combined type to permit the two operations.

The support 32 is connected to the group support 21 by means of an intermediate rocker member 34 adapted to rock about a shaft 35 mounted on the flange 21a.

The support 32 is provided with holes which freely receive three guide pins 36, 37 and 38 mounted on rocker 34. One of the pins 37 is threaded at its free end so as to engage with a nut 39 which urges the support 32 toward the rocker 34 against the action of a spring 40 mounted on the pin 37. The rocker-support assembly is subjected to the action of a tension spring 41 which biases the assembly to rotate counterclockwise around the shaft 35, thus urging the magnetic device 23 towards the film 1. For this purpose one end of the spring 41 is engaged on an appendage 42 of the support 32 and, on the other end, is anchored to a lug 43 mounted on the bolt 26.

The assembly comprising the support 32 and the rocker 34 provides a movable connection for magnetic device 23 to group support 21 and thereby permits adjustment of the magnetic device 23 with respect to the film 1 and more specifically provides for displacement of the device transverse to said film. Thus, since the guide pins 36, 37 and 38 assume an arrangement which is essentially parallel to the axis of rotary shaft 29, it is obvious that by adjusting the nut 39 the device 23 may be displaced in one direction or the other along the axis of said shaft 29.

The rotation of the rocker-support assembly under the action of the spring 41 is limited, during projection, by the film 1 itself against which the magnetic device 23 is elastically biased, while the rotation of the assembly away from the film, in the non-projecting position is limited by contact between a part of the rocker 34 with the flange 21a so that the device 23 terminates just above the circumference of drum 6. (See FIG. 3.) By adjusting the bolt 26, it is possible to vary the tension of the spring 41 and, therefore, the force with which the magnetic device 23 bears against the film 1 during projection.

The second magnetic device 24 (see FIGS. 2 and 4) is mounted on a support 44 by a screw 45. Support 44 is mounted on an intermediate member 46 which is in turn connected to a flange 21b of the group support 21. Member 46 bears two guide pins 47 perpendicular to the shaft 29 on which pins support 44 is slidably mounted. Support 44 is held on the pins 47 by stops 48 against the action of springs 49 which are mounted on pins 47 and bias the device towards the corresponding magnetic track of the film 1. The stops 48 consist of elastic rings which fit in grooves provided in the ends of the pins 47.

Intermediate member 46 is essentially a block provided with holes which slidably receive three guide pins 50, 51, 52 borne by the flange 21b whereby member 46 is connected to flange 21b of group support 21. The pins 50, 51, 52 are parallel to the rotating shaft 29 and one of them, 51, has a threaded end which engages a nut 53 which holds the member 46 against the action of a spring 54 mounted on pin 51.

The assembly comprising the support 44 and the intermediate member 46 provide a movable connection for device 24 to group support 21 which permits the adjustment of the second magnetic device 24 with respect to the film 1 and more specifically makes it possible to effect displacements transverse to said film. The displacements in one direction or another are obtained by adjusting the nut 53.

The magnetic device 24 is similar to the device 23 with respect to connections and functions. The magnetic head may also be of the combined type to obtain the reproduction and the recording of sound or control signals.

The third sound device 25 is a conventional optical reproducer and comprises substantially a photosensitive cell 25' and an excitation lamp 9. The lamp 9 is mounted on the pressure arm 4 when the photosensitive cell 25"

is mounted on the frame 3 as in the illustrated device (see FIG. 1). As already mentioned, the positions of lamp 9 and cell 25' could, of course, be reversed. During the projection of the film, cell 25' is connected to one of the input connections (12, 13, 14) of the amplifier apparatus 11, through which it transmits the electric pulses to the sound reproduction apparatus or to the supplementary apparatus, via one of the output connections (15, 16, 17) of said amplifier 11.

This third device 25 is mounted on its own support 55 to which it is fastened by a metal clamp 56 and a screw 57 (see FIGS. 3 and 5). By adjusting screw 57, it is possible to bring the photosensitive cell 25' closer to or further from the film.

The photosensitive cell 25' is preferably a photodiode which is seated on the support 55 by an elastic bushing 55', although other types of photoresponsive means my be employed.

The support 55 is rotatably fastened to an intermediate plate 58 by a threaded pin 59 which freely passes through a hole in the plate 58 and is locked on the plate 58 by a nut 60. This pin 59 is aligned with the rotating shaft 29 of the drum 6.

The plate 58 is in turn secured to the flange 21c by screws 61 and 62. A ball 63 is interposed between the two screws and housed in suitable seats provided on the flange 21c and on the plate 58. The screws 61, 62 are parallel to the rotating shaft 29 and on each of them there is mounted a spring 64, 65 which biases the plate 58 away from the flange 21c.

The assembly comprises the support 55 and the plate 58 provides a movable connection of the optical device 25 to the group support 21 which makes it possible to fasten the device 25 in proper angular and transverse position with respect to the film. Thus, by loosening the nut 60, it is possible to rotate the support 55 and thereupon the device 25 around the axis of the rotating shaft 29, in the direction of displacement of the film. By then adjusting one of the attachment screws 61 and 62 of the plate 58, it is possible to have the assembly 25, 55, 58 carry out small movements of rotation around the ball 63 and thus obtain displacements of the element 25 transverse to the film.

As can be seen from FIG. 2 and 3, the devices 23 and 25 have been assembled in the same radial plane of drum 6 while the second magnetic device 24 (see FIG. 2) is in radial plane of the drum which is angularly displaced therefrom. This arrangement is particularly advantageous for providing a compact structure which takes up a minimum of space in the projection apparatus, especially in view of the very limited space available therein. It is obvious, however, that any other arrangement of the devices 23, 24 and 25 may be made within the spirit and scope of the invention. Thus, all three of the sound devices could be aligned or only the magnetic devices could be aligned.

The arrangement of the sound devices with respect to the drum 6 may also vary for structural reasons or considerations of space, or with respect to the location of the sound tracks on the film. Thus, for instance, the position of the device 23 could be interchanged with the position of the optical device 25. Furthermore, the devices could be all magnetic or all optical, depending on the type of sound track on the film.

With regard to the magnetic devices, the movable connections with the group support 21 may be all either of the type of the magnetic device 23 or of the type of the magnetic device 24.

While in the illustrated embodiment the sound group comprises three pickup devices, it is obvious that any multiple sound group which has any number of devices, whether of the magnetic type or of the optical type or any combination thereof would be within the scope of the present invention.

It should be emphasized at this point that whatever the number of the devices of the group, the devices, in addition to the function of recording and reproducing sound and/or the spoken word, can also be adapted to perform the function of recording and, in particular, detecting control signals for the control of supplementary apparatus. By supplementary apparatus there is to be understood any apparatus or device associated with the projection apparatus which is able to be placed in operation as a result of one or more control signals reproduced by the magnetic or optical track of the film which reach them through the amplifier apparatus 11. Such supplementary apparatus may include, for example, kaleidoscopes, dispensing or advertising machines, etc.

The apparatus described above can advantageously be used for reproduction and/or recording on a 16 mm. film shown in FIG. 6. This film is provided with three sound tracks, a first magnetic track 71 provided on one edge of the film to cooperate with the first magnetic device 23, a second magnetic track 72 provided on the other edge of the film to cooperate with the second magnetic device 24, and a third, optical track 73 provided between the second sound track 72 and the photographs 74 to cooperate with the optical reproduction device 25 (FIG. 3). The magnetic tracks 71 and 72 are the standard tracks of an 8 mm. film according to ASA specification PH22-88-1965, while the other dimensions are those of the 16 mm. film defined by the following ASA standards:

ASA PH22-12-1953 for the dimensions and perforations;
ASA PH22-48-1965 for the photographs;
ASA PH22-41-1957 for the optical sound track.

In FIG. 7, there is illustrated another 16 mm. film for use with the apparatus of the present invention wherein, in addition to the magnetic track 71 provided along one edge of the film, the entire track 72' between the photographs 74 and the other edge of the film is of the magnetic type. This track corresponds to the magnetic sound track of 16 mm. film according to ASA specification PH22-87. Because of the width of track 72' it is possible to use two or more sound channels.

It is obvious that with such film the sound group 2 must be provided with another magnetic device instead of the optical device 25. The two magnetic sound tracks 71 and 72 of FIG. 6, like the magnetic sound track 71 and 72' of FIG. 7, consist of magnetic sound strips which may be applied to the film by any of the methods known in the art of applying sound tracks, for instance by gluing, brushing, etc. It should be noted that the magnetic sound tracks 71 of FIGS. 6 and 7 are already present on the film for compensating the optical plane; in accordance with the present invention, they are used also for recording and reproduction of sound and signals.

By using the sound group 2 described above with films such as that shown in FIG. 6 instead of prior art devices with films having single sound tracks, the number of sound or spoken audio-visual programs available to the users is increased for the same number of films and, therefore, the possibilities of use of the apparatus are increased. It is clear that, depending on the specific case, the magnetic sound tracks may be prerecorded before the film is stored in the apparatus and that in such case the sound group provides for the reproduction of the recording. Alternatively, both the recording and the reproduction may be effected by the sound group. In order to clarify better the various possibilities of use, there are described below a few examples of possible applications of the apparatus of the invention.

During the projecting of the film (see FIG. 6) in addition to the audio-visual representation given by the simultaneous projection of the photographs 74 and of the associated optical sound track 73, there can be two further sound reproductions by using the two supplementary sound tracks 71 and 72. These additional sound tracks 71 and 72 can serve for the reproduction of sound and/or spoken information to be effected alternately with the audio-visual projection. In such cases, the apparatus behaves like a jukebox, since the two additional sound tracks 71 and 72 correspond to the two sides of a record. The sound tracks 71 and 72 could, however, also constitute a second and a third musical and/or spoken background for the projection of the photographs 74. For example, they could provide a comment spoken in another language and could be used either separately or simultaneously, in which case multiple listening is provided for by means of earphones. They could, furthermore, be used for three-channel stereophonic sound. From the foregoing one can understand how wide are the operation possibilities of the apparatus of the present invention.

One advantage of the film with multiple magnetic sound tracks resides in the fact that it is always possible to demagnetize the strips and re-record them with other information by means of the sound group described above, in accordance with the customary magnetic recording technique. In this way it will be possible to keep the motion picture apparatus in question at all times up to date with new songs, programs, etc. while continuing to use as support the films bearing the same photographs.

The magnetic sound tracks may be used also to effect recordings either simultaneously or not with the visual projection and simultaneously or not with another sound recording or reproduction.

Furthermore, one or more magnetic tracks or the optical track may be used for the actuating of the supplementary apparatus, simultaneously or not with the projection of the film or in synchronism with some phases of the projection.

For example, while the visual and spoken projection of an advertising program is taking place, at the time when the speaker presents or announces the product advertised, the pulses recorded on a magnetic track could be used as a control signal to actuate an adjoining machine which supplies a sample of the product. The adjoining machine could be a machine which dispenses drinks, cosmetics, various objects, etc. At the desired moment, during the projection, the pulses could, furthermore, place in operation a device which is being advertised, for instance a toy such as a train, etc.

In the latter operations there are evident the advantages of the machine as means for display and advertising. By suitably combining the programs, there can be readily achieved an advertising machine for use in department stores and having the ability to advertise and distribute the product and possibly also to control the operation of the product being displayed.

In its operation as a sound reproduction and recording machine, the apparatus behaves as an ordinary magnetic recorder, aside from the visual projection. There are provided connections with the loudspeakers or earphones and with the microphones, as well as the switching means for activating or disconnecting the various circuits. In particular, in the case of the magnetic devices which are constantly in resilient contact with the film being projected, it is necessary to exclude the channels of the device or devices not concerned while in the case of the optical devices it is sufficient to keep the excitation lamp off.

One use of the apparatus as an educational device might be the following:

Let us assume that the projection concerns a lecture in a foreign language. On the screen there appears the teacher who explains the lesson while his voice is heard in synchronism with the projected picture. The student who follows the lesson can during the projection use one of the magnetic sound tracks for the recording and then for hearing his own voice. For example, as the teacher pronounces the words, the student, having a microphone in front of him, repeats the same words in order to record them on the magnetic track. At the end of the lesson, the student repeats the projection, but listens after the voice of the teacher also to his voice which was previously recorded. He can thus compare the phonetic differences between the pronunciation of the teacher and his own and possibly erase any erroneous pronunciation, re-record to correct and then compare it with that of the teacher. The student can also listen to his own voice simultaneously with the lip movements of the teacher while the sound track recorded by the teacher is turned off.

Further applications of the apparatus are, of course, possible in fields other than recreation, advertising and education. In particular, its use can be contemplated in the field of travel, industry, business, etc.

It will be obvious that while the invention has been illustrated with reference to an apparatus provided with a film magazine, it may also be applied, for example, to a sound reproduction apparatus, such as a "jukebox," for the alternate playing of films and records.

While I have herein shown and described the preferred form of the present invention and have suggested modifications therein, other changes and modifications may be made therein within the scope of the appended claims without departing from the spirit and scope of this invention.

What I claim is:

1. In motion picture projection apparatus having a frame and a pressure member movably mounted on said frame for maintaining a selected film in projection position, said film having a plurality of sound tracks thereon, the improvement which comprises, in combination, a film sound group comprising sound group mounting means mounted on said frame, a sound group support member mounted on said mounting means, a sound drum rotatably mounted on said support member and a plurality of sound devices for reproducing sound and control signals for supplementary apparatus from said sound tracks of said film, said sound devices being movably mounted on said support member with respect to each other and displaced from said drum for bringing said sound devices into cooperative relationship with said sound tracks when said film is maintained in said projection position against said drum by said pressure member, said sound group comprising three said sound devices, the first and second of said sound devices being mounted on said support member in a plane extending radially of said drum and the third of said sound devices being mounted on said support member in a different radial plane of said drum, whereby a minimum of space is occupied by said sound group.

2. In motion picture projection apparatus having a frame and a pressure member movably mounted on said frame for maintaining a selected film in projection position, said film having a plurality of sound tracks thereon, the improvement which comprises, in combination, a film sound group comprising sound group mounting means mounted on said frame, a sound group support member mounted on said mounting means, a sound drum rotatably mounted on said support member and a plurality of sound devices for reproducing sound and control signals for supplementary apparatus from said sound tracks of said film, said sound devices being movably mounted on said support member with respect to each other and displaced from said drum for bringing said sound devices into cooperative relationship with said sound tracks when said film is maintained in said projection position against said drum by said pressure member, an intermediate support member movably mounted on said group support member, one of said sound devices being movably mounted on said intermediate support member for adjusting the position of said sound device relative to its corresponding sound track on said film.

3. The apparatus defined in claim 2 wherein said intermediate support member comprises a pair of intermediate members movably connected to each other, said sound device being mounted on the first of said intermediate members and the second of said intermediate members being movably mounted to said group support member.

4. The apparatus defined in claim 1 wherein at least one of said sound devices further comprises means for recording sound and control signals on its associated sound track.

5. The apparatus defined in claim 3, further comprising biasing means interposed between said first and second intermediate members and between said second intermediate member and said group support member for urging said members away from each other, and stop means associated with said biasing means for limiting the displacement of said members away from each other, at least one of said stop means being adjustable for controlling the amount of said displacement.

6. The apparatus defined in claim 5 wherein said sound device includes a magnetic head, said apparatus further comprising means for elastically biasing said magnetic head toward its corresponding sound track of said film when said film is maintained in said projection position.

7. The apparatus defined in claim 2 wherein said intermediate support member comprises a block slidably mounted on said group support member, said block being slidable in a path which is parallel to the axis of rotation of said drum.

8. The apparatus defined in claim 1 wherein at least one of said sound devices comprises an optical sound reproduction device including a photosensitive element and an associated source of light, said photosensitive element being movably mounted on said group support member and said source of light being mounted on said movable pressure member.

9. The apparatus defined in claim 8, further comprising an optical support member movably mounted on said group support member, said photosensitive element being rotatably mounted on said optical support member, the axis of rotation of said element coinciding with the axis of rotation of said drum.

10. The apparatus defined in claim 1 wherein said selected film is a photographic film having a first magnetic sound track along one edge thereof, a second magnetic sound track along the other edge thereof and an optical sound track intermediate said second magnetic sound track and the photographic strip thereof, two of said sound devices comprising magnetic sound devices for cooperating with said magnetic sound tracks, and the third of said sound devices being an optical sound device for cooperating with said optical sound track.

References Cited

UNITED STATES PATENTS

| 2,308,260 | 1/1943 | Bakos | 352—10 |
| 2,940,356 | 6/1960 | Volkmann | 352—11 |
| 3,150,810 | 9/1964 | Heaton | 352—10 |

FOREIGN PATENTS 637,962  10/1936  Germany.

NORTON ANSHER, Primary Examiner

D. S. STALLARD, Assistant Examiner

U.S. Cl. X.R.

353—10